(12) United States Patent
Housley et al.

(10) Patent No.: US 11,752,480 B2
(45) Date of Patent: Sep. 12, 2023

(54) APPARATUS FOR ENCLOSING A CHEMICAL LOOPING PROCESS

(71) Applicant: THE BABCOCK & WILCOX COMPANY, Akron, OH (US)

(72) Inventors: Donald C. Housley, New Franklin, OH (US); Robert T. Cunningham, Uniontown, OH (US); Thomas J. Flynn, North Canton, OH (US); Luis G. Velazquez-Vargas, Copley, OH (US); Jinhua Bao, Canal Fulton, OH (US); Jeremy L. Remus, Uniontown, OH (US); Albert J. Bennett, Norton, OH (US)

(73) Assignee: Babcock & Wilcox Company, Akron, OH (US)

( * ) Notice: Subject to any disclaimer, the term of this patent is extended or adjusted under 35 U.S.C. 154(b) by 0 days.

(21) Appl. No.: 17/587,736

(22) Filed: Jan. 28, 2022

(65) Prior Publication Data
US 2022/0241745 A1    Aug. 4, 2022

Related U.S. Application Data
(60) Provisional application No. 63/145,601, filed on Feb. 4, 2021.

(51) Int. Cl.
| | |
|---|---|
| *B01J 8/24* | (2006.01) |
| *B01J 8/18* | (2006.01) |
| *B01J 19/28* | (2006.01) |
| *C01B 3/36* | (2006.01) |
| *B01J 8/00* | (2006.01) |
| *F23C 99/00* | (2006.01) |
| *F23C 10/30* | (2006.01) |

(52) U.S. Cl.
CPC .................. *B01J 8/24* (2013.01); *B01J 8/005* (2013.01); *B01J 8/009* (2013.01); *B01J 8/1845* (2013.01); *B01J 19/28* (2013.01); *C01B 3/36* (2013.01); *F23C 10/30* (2013.01); *F23C 99/006* (2013.01); *B01J 2208/00132* (2013.01); *B01J 2208/00477* (2013.01); *B01J 2219/1923* (2013.01); *C01B 2203/025* (2013.01); *F23C 2900/99008* (2013.01)

(58) Field of Classification Search
CPC . B01J 8/1863; B01J 8/1872; B01J 8/24; B01J 8/26; B01J 8/28; B01J 8/005; B01J 8/009; B01J 2208/00132; C01B 3/36; F23C 2900/99008
See application file for complete search history.

(56) References Cited

U.S. PATENT DOCUMENTS

| | | | |
|---|---|---|---|
| 6,532,905 B2 * | 3/2003 | Belin | F22B 31/0084 122/4 D |
| 8,877,147 B2 * | 11/2014 | Fan | C10J 3/463 422/600 |
| 9,616,403 B2 * | 4/2017 | Fan | B01J 8/0015 |

* cited by examiner

*Primary Examiner* — Lessanework Seifu
(74) *Attorney, Agent, or Firm* — Michael J. Seymour

(57) ABSTRACT

The present invention relates generally to an apparatus for housing a chemical looping process comprising of at least one fluidized-bed combustor reactor, at least one entrained riser, at least one particle separator, optionally at least one particle holding reactor, at least one moving-bed reactor, at least one standpipe, at least one L-valve system for solid flow control and interconnecting sections.

28 Claims, 5 Drawing Sheets

Plan Section C-C
Plan Section D-D
Plan Section E-E
Plan Section F-F
Plan Section G-G
Plan Section H-H
Plan Section J-J Plan Section B-B Plan Section A-A

APPARATUS FOR ENCLOSING A CHEMICAL LOOPING PROCESS

FIELD AND BACKGROUND OF THE INVENTION

1. Field of the Invention

The present invention relates generally to an apparatus for housing a chemical looping process comprising of at least one fluidized-bed combustor reactor, at least one entrained riser, at least one particle separator, optionally at least one particle holding reactor, at least one moving-bed reactor, at least one standpipe, at least one L-valve system for solid flow control and interconnecting sections.

2. Description of the Related Art

Without being bound to any one definition, chemical-looping technologies are technologies that do not use "free" oxygen, but make use of one or more metallic oxygen carriers, or catalysts to transfer the oxidizing agent to a fuel for full or partial conversion. Such processes are usually carried out in a connected fluidized-bed system, with an air reactor, in which a reduced metal is being oxidized. The product of the air reactor is typically nitrogen with several percent of oxygen. The oxidized metal is typically transferred to the fuel reactor, where a fuel is used to reduce the metal oxide. The gaseous product of the fuel reactor is generally a mixture of steam and $CO_2$, which can be treated downstream and sequestered or utilized. Chemical looping processes are being developed worldwide as alternative methods to produce hydrogen, syngas, steam, heat and power. Systems for the chemical looping of coal, natural gas, oil, biomass and other hydrocarbon fuels are known.

Recently, chemical looping processes are being developed worldwide as alternative methods to produce hydrogen, syngas, steam, heat and power. For example, U.S. Pat. No. 4,343,624 discloses a three-stage hydrogen production method and apparatus utilizing a steam oxidation process. In the first stage, a low-Btu gas containing $H_2$ and CO is formed from a feedstock such as coal. The low-Btu gas is then reacted in a second stage with ferric oxide ($Fe_3O_4$) to form iron (Fe), carbon dioxide ($CO_2$) and steam ($H_2O$) in accordance with the reaction:

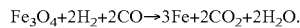

The steam and iron are then reacted in a third stage to form hydrogen gas by the reaction:

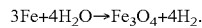

The iron oxide is taught by the patentee to be recyclable to the second stage for use in the iron oxide reduction reaction, such as by continuously returning the iron oxide to the second stage reactor via a feed conduit. At least one of the stages takes place in a fluidized-bed reactor.

U.S. Pat. Nos. 5,827,496, 6,007,699, and 6,667,022 describe a method and apparatus for separating synthesis gas (a gas comprising mainly $H_2$ and CO) and other gaseous fuels into separate streams of wet $H_2$ and $CO/CO_2$ using a mixture of limestone and iron oxide circulating between two fluidized-bed reactors. U.S. Pat. No. 6,669,917 describes a similar process using a set of three fluidized-beds reactors.

U.S. Pat. Nos. 6,663,681, 6,685,754, and 6,682,714 are all directed to a method of producing $H_2$ gas using low-cost carbon feedstocks, including high sulfur coal, and steam. The two-step process injects steam into a molten metal (Fe) bath reactor. The oxygen in the steam reacts with the iron to form $H_2$ and FeO. In the second step, carbon fuel is inputted, the FeO is reduced to its metallic state, and $CO_2$ is released. However, the process must be carried out at very high temperatures above about 1100° C. to about 1300° C. in specially-designed ceramic reactors such as those used in smelting operations.

U.S. Pat. No. 5,447,024, teaches a chemical looping combustion method for a power plant that includes reacting a hydrocarbon fuel with a metallic oxide in a first reactor to release gases containing carbon dioxide and water vapor to operate a turbine while reducing a portion of the metal oxide. The reduced metal oxide is reacted in a second reactor where it is oxidized with air, to produce a second gas stream that is also used to operate a turbine. A small amount of steam is added to the air primarily to improve the heat transfer inside the bed, rather than to produce any hydrogen. In one embodiment, the metal oxide is a nickel oxide admixed with yttrium-stabilized zirconium and then sintered at high temperatures to form solid, non-porous particles. It is taught that the particles can be recycled between the two reactors.

U.S. Pat. No. 7,767,191 discloses a method for producing hydrogen gas that comprises reducing a metal oxide in a reduction reaction between a carbon-based fuel and a metal oxide to provide a reduced metal or metal oxide having a lower oxidation state, and oxidizing the reduced metal or metal oxide to produce hydrogen and a metal oxide having a higher oxidation state. The metal or metal oxide is provided in the form of a porous composite of a ceramic material containing the metal or metal oxide. The porous composite can comprise either a monolith, pellets, or particles.

Current chemical looping system lose heat through the walls of the components such that adiabatic operation cannot be achieved. Thus, there is a need in the art, for an improved chemical looping system, or apparatus, that have better heat management properties and more preferably a system or apparatus design that can recover the heat lost through the walls of the components.

SUMMARY OF THE INVENTION

The present invention relates generally to an apparatus for housing a chemical looping process comprising of at least one fluidized-bed combustor reactor, at least one entrained riser, at least one particle separator, optionally at least one particle holding reactor, at least one moving-bed reactor, at least one standpipe, at least one L-valve system for solid flow control and interconnecting sections.

In accordance with one aspect of the present invention, a chemical looping system is provided and comprises the element of a fluidized-bed combustor reactor comprising a windbox, a heat exchange surface, and a oxidant distribution grid, a particle, a particle separator, and a riser, wherein the fluidized bed reactor oxidizes the particle, creates a carrier gas, and the riser transports the oxidized particle and the carrier gas to the particle separator.

The embodiment of FIG. 3 relates to a chemical looping system for steam generation for power applications and comprising one or more of the following elements: a fluidized-bed type combustor 102, the fluidized-bed type combustor having at least one in-bed heat exchange surface 104 and a refractory-lined membrane wall 106; at least one tube bundle 110 (FIG. 4A), where the at least one tube bundle (FIG. 4A-110) is located in the fluidized-bed type combustor 102; at least one L-valve 112, the at least one L-valve 112 being operatively connected to the fluidized-bed type combustor 102 such that the at least one L-valve 112 is arranged to provide incoming solids to the at least one tube bundle (FIG. 4A-110) that is oriented as in-line tubes (e.g., serpentine tubes, staggered tubes, etc.) or other with the lanes open to the incoming solids from the at least one L-valve 112; a windbox 114 formed in a bottom of the fluidized-bed type combustor 102, windbox 114 being designed to permit the introduction of combustion air to the bottom of the fluidized-bed type combustor 102 through windbox 114 and at least one distribution grid 116 for supplying oxidation air; at least one reducer reactor 140 being operatively connected to the fluidized-bed type combustor 102 via at least one riser 122, wherein the incoming solids discharge from the riser 122 through an expanded section 126 whereby the velocity of a carrier gas for the incoming solids is reduced; and at least one particle receiver 128, wherein the at least one particle receiver 128 is designed to further slowdown and drop out the incoming solids.

In an alternative embodiment of FIG. 3 for steam and power generation, the system may include the element of a moving-bed reducer reactor, where natural gas enters at the bottom of the reducer through ports 148 and flows counter-currently with the solids, reacts therewith, and produces $CO_2$ and $H_2O$ capable of exiting the top of the reducer through port 138.

In an alternative embodiment depicted in FIG. 1, a system for syngas generation from natural gas is suggested comprising on or more of the following elements: a fluidized-bed combustor, at least one riser to transport the solids from the combustor to at least one particle separation zone, a counter-current moving-bed reducer reactor, a co-current moving-bed reformer reactor, and a counter-current moving-bed oxidizer reactor, stand-pipe and L-valve. Where the properties of co- and counter-current describes the relative movement of solids and gaseous species within the reactors.

In the alternative embodiment for syngas generation, the system may include an element where natural gas enters the top of the reactor system through a series of ports similar to ports 148 as shown in FIG. 3 and moves co-currently to the particles and exit the reactor as CO and $H_2$ at the bottom of the reactor through a port similar to the one shown in FIG. 3 as 138.

In an alternative embodiment for syngas generation, the system may include a combine reformer reactor and oxidizer reactor element.

In the alternative embodiment for hydrogen production (not shown), the system may include the element of a moving-bed oxidizer where steam enters at the bottom of the reactor through ports similar to those shown in FIG. 3 as 148 and moves counter-currently exiting the oxidizer as $H_2$ through similar port as shown in FIG. 3 as 138.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
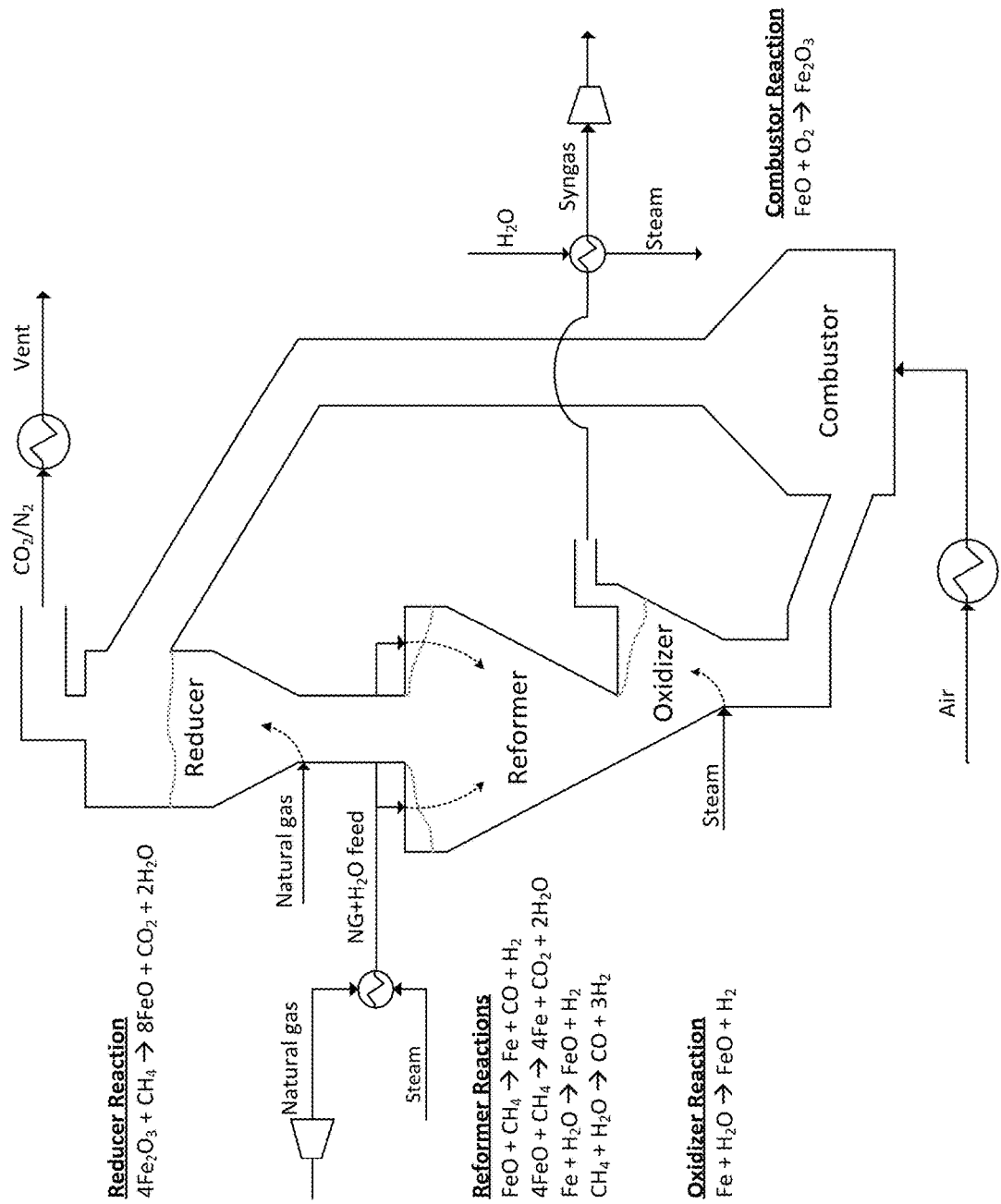
FIG. 1 is an illustration of a chemical looping system for syngas production from natural gas in accordance with one embodiment of the present invention.

The present invention relates generally to an apparatus for housing a chemical looping process comprising of at least one fluidized-bed combustor reactor, at least one entrained riser, at least one particle separator, optionally at least one particle holding reactor, at least one moving-bed reactor, at least one standpipe, at least one L-valve system for solid flow control and interconnecting sections.

The present invention provides systems, apparatuses and methods for using chemical looping with a fuel source, in conjunction with steam reduction using a metal such as for example iron, to produce synthesis gas ($CO+H_2$), hydrogen gas and/or steam for the generation of electric power. The fuel can comprise a solid, liquid, or gaseous, carbon-based fuel. Examples of carbon-based fuels useful in the practice of embodiments of the present invention include, but are not limited to, coal, coal char, petroleum coke, oil, oil shale, oil sands, biomass, methane-rich gases, fuel-rich waste gases from fuel cells, separation processes and derivatives and mixtures thereof. If a solid or liquid fuel is used, it can optionally be gasified prior to the reduction reaction using for example, pyrolysis, evaporation, partial oxidation, hydrogenation, carbon dioxide, steam, oxygen, or a combination of these techniques.

In various additional embodiments of the present invention, an oxygen-rich source, such as air, for re-oxidizing the metal oxide is provided and the composite metal oxide is in particle form suitable for the gasification, partial oxidation or complete combustion of carbon-based fuels thereby yielding a separated carbon monoxide-rich or carbon dioxide-rich flue gas stream.

Traditionally, the chemical energy stored inside coal has been utilized by combustion with $O_2$ with $CO_2$ and $H_2O$ as products. Similar reactions can be carried out if instead of oxygen, an oxygen carrier is used. Metal oxides such as $Fe_2O_3$ can act as suitable oxygen carriers. However, unlike combustion of fuel with air, there is a relatively pure sequestration-ready $CO_2$ stream produced on combustion with metal oxide carriers. The reduced form of metal oxide can then be reacted with air to generate a heated gas stream to produce steam for electricity generation, or reacted with steam to form a relatively pure stream of hydrogen, which can then be used for a variety of purposes.

The metal oxide oxygen carrier is a robust porous ceramic composite into which the metal/metal oxide oxygen carrier can be placed. Such a composite can be used repeatedly in redox chemical looping reactions with little or no decrease in activity or oxygen carrying capacity. Depending on the type of reactor used, the metal/metal oxide oxygen carrier can comprise a monolithic structure, pellets, or particles. For example, if a fluidized-bed reactor is used, the porous ceramic composite (or incoming solids) may have a particle size of from between about 50 microns to about 1 mm. If a moving-bed reactor is used, the porous ceramic composite (or incoming solids) may have a particle size of from between about 1 mm to about 50 mm. If a fixed bed reactor is used, the metal/metal oxide oxygen carrier (or incoming solids) may have a particle size of from between about 1 mm to larger monolithic structures. In at least one embodiment of the present invention a moving-bed reducer reactor is coupled with a fluidized-bed combustor reactor and the size of the circulating particles is in the range of about 50 micron to about 2 mm.

Figure 3:
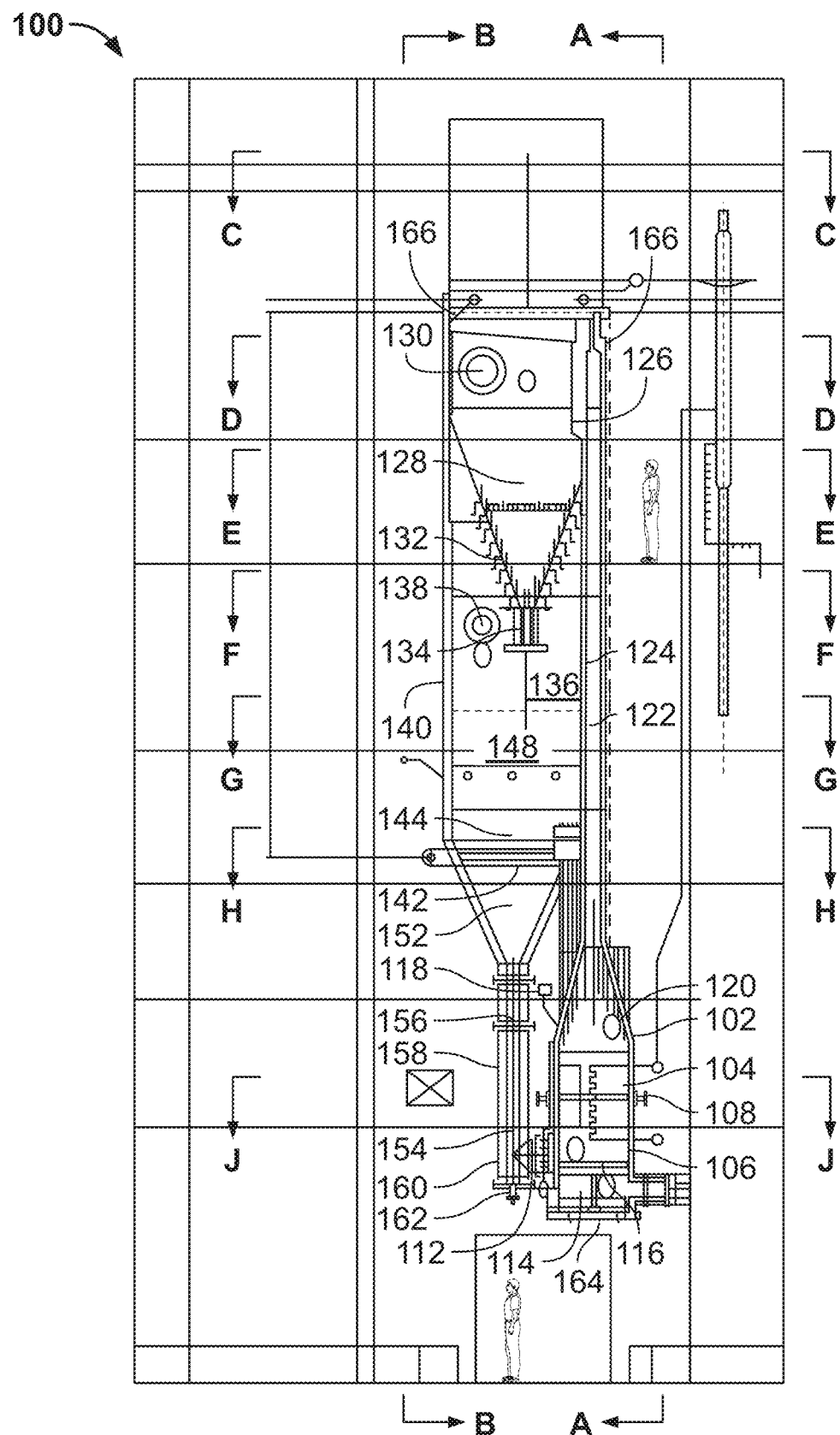
FIG. 3 is an illustration of chemical looping apparatus for steam and power production from coal according to one embodiment of the present invention.

Because of the relatively large sizes of the porous ceramic particles used in certain embodiments of the present invention, the particles can be easily separated and recovered from the ash and combustion products of carbon-based fuels using a particle separator. The smaller metal/metal oxide oxygen carrier particles leave via the particle disengagement hopper gas outlet port 130 as shown in FIG. 3 and are captured in a high efficiency downstream particle collector (not shown) for return to the particle manufacturer for reprocessing. The smaller ash particles and some small metal/metal oxide oxygen carrier particles leave the system via the reducer outlet gas outlet port 138 as shown in FIG. 3 and are captured downstream in a high efficiency particle separator (not shown) for disposal to an approved landfill. In the case of natural gas firing or other fuels that do not contain ash, the small metal oxide particles exiting through port 138 can be captured downstream in a high efficiency particle separator (not shown), and returned to the particle manufacturer for reprocessing.

In another embodiment, any one or more suitable metal oxide compounds can be utilized in place or, or in combination with, the metal/metal oxide ceramic so long as the one or more metal oxide oxygen carrier compounds are able to undergo a redox reaction. Suitable metal oxide compounds are those selected various transition metal oxide compounds such as, but not limited to, one or more iron oxides, one or more copper oxides, one or more aluminum oxides, etc. While not limited thereto, such metal oxides are typically utilized in pellet or particle form so as to increase the surface area available for reactivity.

Embodiments of the present invention make use of a reaction sequence known as chemical looping. Chemical looping is a process by which combustion of a carbon-based fuel occurs in two steps. As shown in FIG. 3, in the first step, a carbon-based fuel such as, for example, coal, reduces an oxygen carrier (such as, for example, $Fe_2O_3$). An oxygen, steam, carbon dioxide, carbon monoxide, and or hydrogen-rich containing stream(s), can optionally be added at this first stage. In embodiments of the present invention, the oxygen carrier is in the form of a porous composite. In the second step, the oxygen carrier (such as, for example, Fe, or FeO) is oxidized with air to re-oxidize and reheat the particles. The hot re-oxidized particles are returned to the top of the reducer reactor (looped) to begin the cycle again.

Thus, in the first stage, the oxidation state of the oxygen carrier is lowered as the atomic oxygen is consumed in the conversion of the fuel. In the example using iron oxide ($Fe_2O_3$), the oxidation state of iron is lowered from +3 to +2.66 ($Fe_3O_4$), +2 (FeO) or 0 (Fe). The first stage reaction can be expressed as:

$$C_xH_y + MO_P \rightarrow MO_q(q<p) + xCO_2 + y/2H_2O,$$

where $C_xH_y$ represents a carbon-based fuel, M is the metal, and $MO_P$ is the metal oxide and $MO_q$ is the reduced metal oxide.

As shown in FIG. 3, carbon dioxide, water vapor and other contaminants such as, for example, sulfur dioxide (not specifically shown) are removed from the reducer reactor 140 through exhaust port 138. After removal of the water vapor and optional removal of contaminants, the gaseous stream, rich in carbon dioxide, can be sent to a sequestration operation. Heat can be recovered from the hot product gas stream to generate steam for electricity generation. A portion of the carbon dioxide can be recycled to the reactor to promote the reduction reaction through ports (not shown) in region 152. The recycled carbon dioxide is referred to as enhancer gas when returned to the reducer reactor. Due to the significant countercurrent flow of enhancer gas and products of combustion, some very small attrited reduced metal oxide oxygen carrier particles and the fuel ash (in the case where the natural gas is replaced with an ash-bearing solid hydrocarbon fuel like coal or biomass) are swept upwards through the downward moving bed of larger particles, and exit the reducer reactor through a port 138 at the top of the reactor. The temperature of the particles returning to the particle receiver in the range of about 800° C. to about 1100° C. This temperature range is far below the melting point of the metal/metal oxide oxygen carrier or the ceramic composite matrix and is much lower than some prior art processes which are operated at temperatures well in excess of 1100° C. (near the melting or sintering temperatures of several metals and metal oxides).

In an alternative embodiment as shown if FIG. 1, the metal or metal oxide oxygen carrier is sequentially reduced while moving through the reducer reactor, and reformer reactor and partially oxidized in the oxidizer reactor.

In the reducer reactor, the metal oxide is partially reduced while reacting counter-currently with the fuel. The reducer reaction can be expressed as:

$$C_xH_y + MO_P \rightarrow M/MO_q(q<p) + xCO_2 + y/2H_2O$$

where $C_xH_y$ represents a carbon-based fuel, M is the metal, and $MO_P$ is the metal oxide at its highest oxidation state and $MO_q$ is the metal oxide at a reduced oxidation state.

In the reformer reactor, the metal oxide particles are further reduced co-currently with reaction with the fuel. The reformer reaction can be expressed as:

$$C_xH_y + MO_q \rightarrow M/MO_b(b<q) + xCO + y/2H_2$$

where $C_xH_y$ represents a carbon-based fuel, M is the metal, and $MO_b$ is the metal oxide at an intermediate oxidation state and $MO_b$ is the reduced metal oxide.

Additionally, to the reactions of FIG. 1, optionally oxygen, steam, carbon dioxide, carbon monoxide rich streams can also be added to the reducer and reformer reactors above. Thus, optionally natural gas can be introduced with steam to reform the natural gas to carbon monoxide and hydrogen in the reformer reactor.

In the oxidizer reactor, the metal oxide is partially oxidized with steam to have a higher oxidation state. The reaction in the oxidizer can be expressed as:

$$M/MO_b + H_2O(steam) \rightarrow H_2 + MO_q(q>b)$$

The oxidation reaction produces a relatively pure stream of wet hydrogen gas which can then be used in a variety of ways as will be explained in greater detail below with respect to specific examples of end uses.

In the combustor reactor, the reduced or partially reduced metal oxide oxygen carrier is partially or fully oxidized in the presence of air. This is an exothermic reaction which also serves to reheat the particles for return to the top of the reducer reactor. The hot particles are returned to the top of the reducer via a riser and particle disengagement separator. The separation efficiency of the particle separation zone is set to allow small particles below a recommended cut size to exit the system with the hot oxygen-depleted air through the combustor outlet port. Heat is recovered from the hot particles and gas to generate steam for the process and/or steam generated in connection with any one or more industrial plant processes. Fines entrained from the combustor exhaust gas may be cooled down and collected in a high efficiency particle collector, such as a baghouse or electrostatic precipitator, and returned to the oxygen carrier manufacturer to be reprocessed.

An alternative embodiment, the system in FIG. 1 can be operated under pressure.

Turning to a system, or apparatus, in one embodiment a chemical looping facility comprising a fluidized-bed combustor and entrained-flow riser is designed such that the integral steam generating surface has to match the heat release profile of the specific metal oxide that is being used. In one embodiment, the apparatus comprises a water-jacket enclosure where the combustor and riser walls are refractory-lined. The surface-to-volume ratio and optional in-bed surface of the combustor is such that the heat absorption and thermal environment match heat generation along the height of the combustor and maintain a uniform temperature distribution and ensure temperature excursions do not occur that may damage the metal oxide particles.

Figure 2:
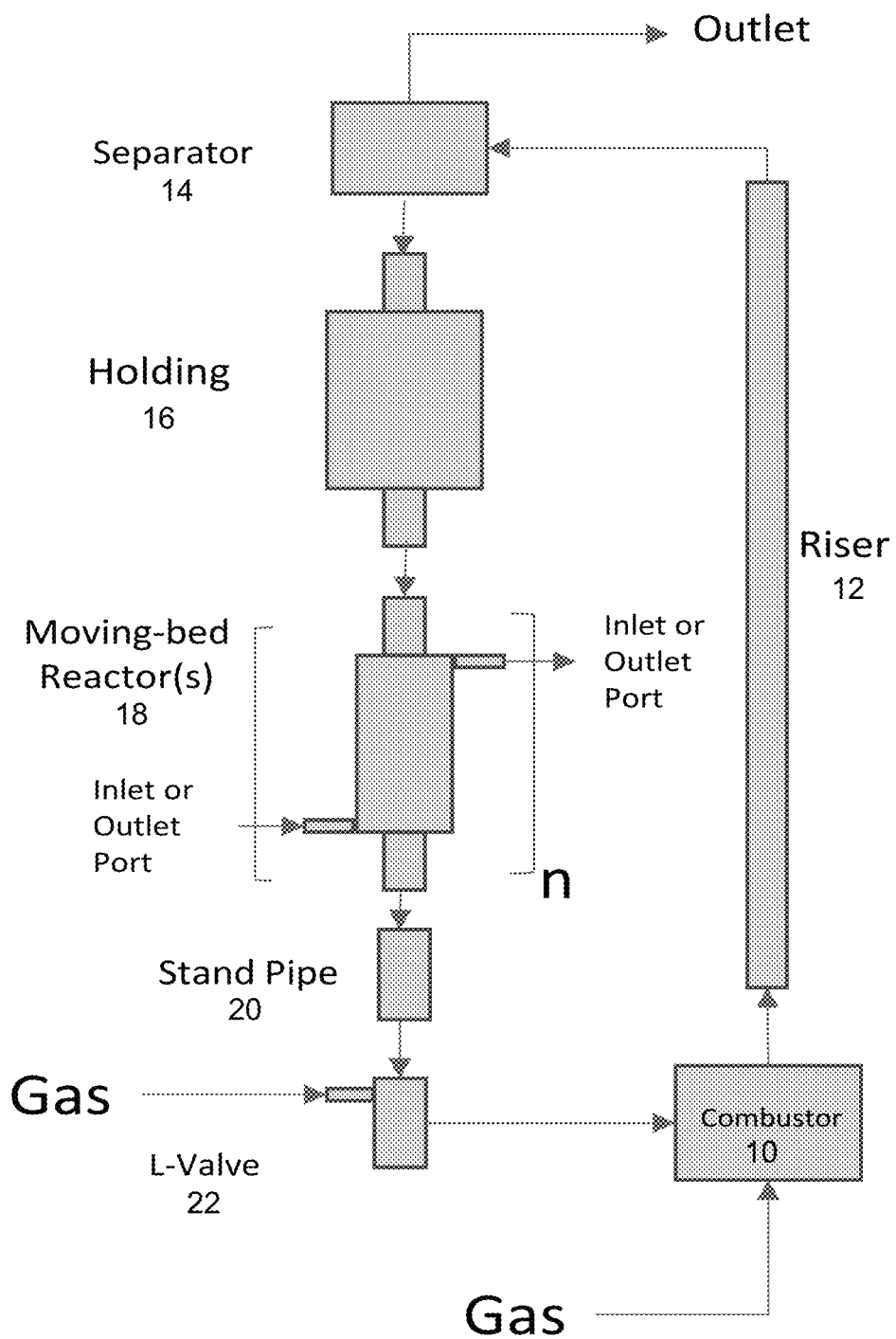
FIG. 2 is an illustration of a basic chemical looping apparatus system.

Turning to FIG. 2, FIG. 2 illustrates one possible embodiment for a chemical looping system according to the present invention where such a system is comprised of a combustor 10 designed to receive a suitable gas such as air, where such combustor 10 is operatively connected to a riser 12, where the riser 12 is also operatively connected to a separator 14. As is illustrated in FIG. 2, separator 14 is operatively connected to a holding tank 16, where holding tank 16 is also operatively connected to one or more (represented by "the bracketed n" in FIG. 2) moving-bed reactors 18, where the last one of the one or more moving-bed reactors 18 is operatively connected to standpipe 20, where standpipe 20 is also operatively connected to L-valve 22. L-valve 22 is designed to also receive a suitable gas including, but not limited to, steam, or air, and is further operatively connected to combustor 10. Each moving-bed reactor 18 includes at least one inlet port and at least one outlet port (labeled as such in FIG. 2) for receiving one or more suitable gases including, but not limited to, steam, methane, natural gas, air, carbon dioxide, etc.

Babcock & Wilcox Company (B&W) has designed commercial circulating fluidized-bed boilers that are furnished with an in-bed heat exchanger (IBHX) tube bundle (see, e.g., U.S. Pat. No. 6,532,905, the complete text of which is hereby incorporated herein in its entirety). The purpose of this heat exchanger surface as shown in FIG. 3 as 104 is to generate superheated steam in the combustor where the overall heat transfer coefficient is an order of magnitude higher than in the typical location in the convection pass, thereby, allowing significantly less high alloy metal to be used to manufacture the superheated steam generation surface and consequently lowering the cost of high grade alloys. The IBHX also has the advantage of providing high turndown capability and control during transient operation of circulating fluidized beds. The in-bed surface can also be allocated to generating surface or a combination of superheat, reheat or generating surface.

Figure 4A:
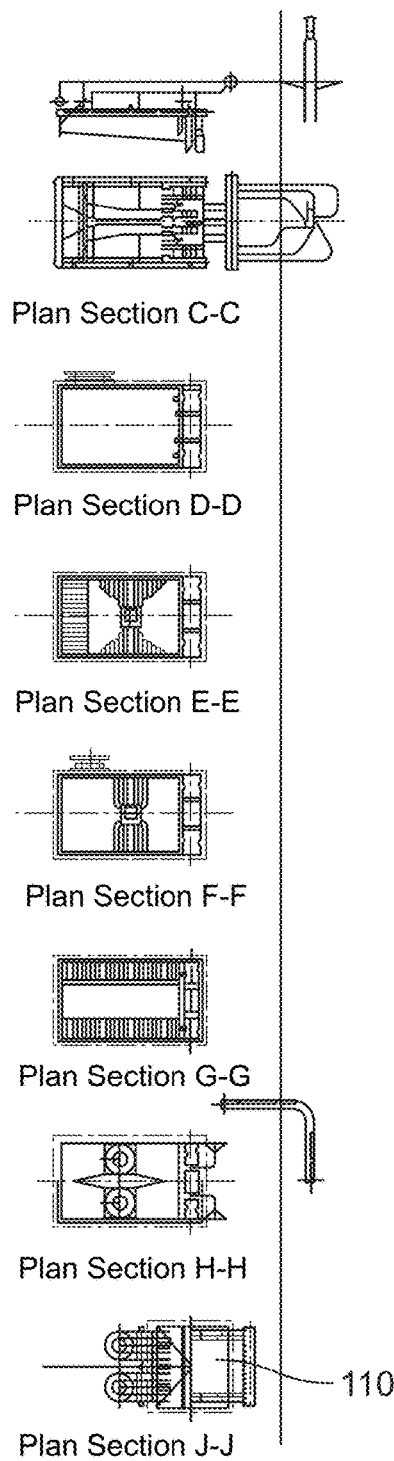
FIGS. 4A to 4C are illustrations of the chemical looping apparatus of FIG. 3 along the various callout lines of FIG. 3.
Figure 4B:
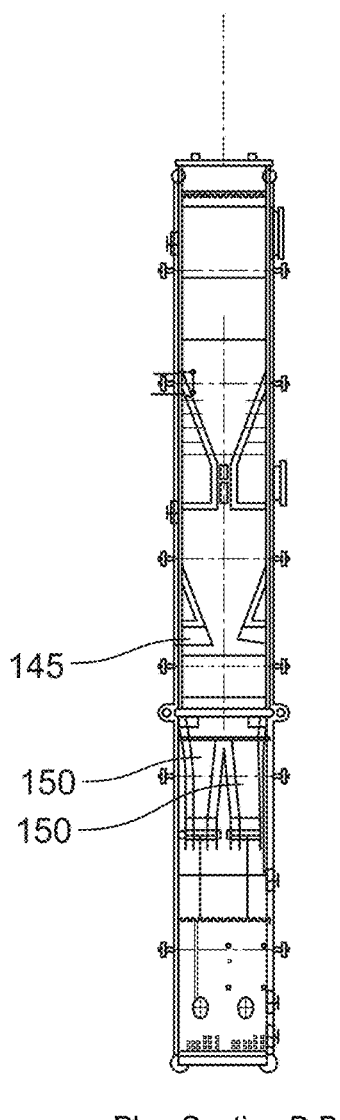
Figure 4C:
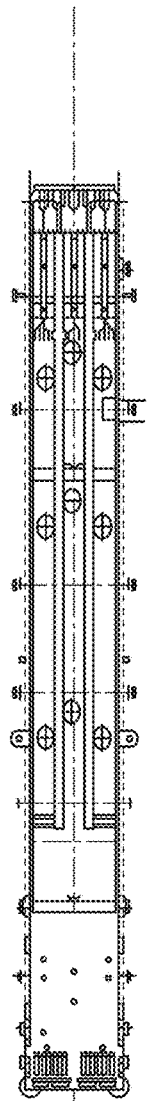

Turning to FIGS. 3 and 4, these figures illustrate one embodiment of a system 100 in accordance with the present invention. As is illustrated, in one embodiment, combustor 102 is a fluidized-bed type combustor with an in-bed heat exchange surface 104. Combustor vessel 102 comprises of refractory-lined membrane wall construction 106. Refractory-lined vessels, such as those used in various designs are prone to significant thermal expansion. In addition, flanged connections typically used to join the individual refractory components are prone to hazards associated with hot-torqueing the flange bolts. In one embodiment, the use of a membrane-wall construction reduces the thermal expansion that occurs. Traditional techniques known to those of skill in the art can be used to provide structural support 108. Based on B&W's experience with a 2.5 $MW_t$ (thermal units) circulating fluidized-bed pilot facility, the minimum thermal input and associated size of the system is 0.75 MWe (electric units) equivalent or 2.5 $MW_t$ to achieve a representative thermal environment and reaction environment. Although the system of FIGS. 3 and 4 is not adiabatic, auto-thermal operation can be achieved using this design.

Combustor 102 design provides adequate residence time for the metal oxide to oxidize and preferably fully oxidize. Since the surface-to-volume ratio of combustor 102 is small relative to pilot facilities, the heat loss to the walls is small relative to the total heat generated by the oxidation of the reduced metal oxide.

The in-bed heat exchange surface 104 provides cooling to limit the bed temperature to a peak temperature less than the rated temperature of the metal oxide. The in-bed heat exchange surface can be used as generating bank surface, i.e., water-cooled, reheated or superheated steam surface, i.e., steam-cooled. The tube bundle (see, FIG. 4, view J-J, reference numeral 110) is arranged as in-line serpentine tubes with the lanes open to the incoming solids from L-valves 112. In one embodiment, the front, leading edge of the serpentine tubes closest to the incoming solids is set back from the one or more L-valve(s) 112 discharge(s) to allow the solids adequate distance to become uniformly mixed and reach a uniform temperature prior to encountering tube bundle 110. In another instance, the tubes, be they serpentine or another orientation, can be designed to not have any offset or set back so that such tubes can cross the full width of the one or more L-valve(s) 112. This distance is set by multiphase modeling and can therefore vary. Combustion air is introduced to the bottom of combustor 102 through a windbox 114 and distribution grid 116. The superficial velocity of the air through fluidized-bed combustor 102 is set by adjusting the plan area of combustor 102 to ensure the velocity is low enough to reduce any undesired erosion of tube bundle 110, yet high enough to provide good heat transfer. Further, the elevation of the lowest tube run above the distributor is set to minimize gas/solid impingement on the underside of the tubes to limit erosion and/or to permit suitable maintenance to take place.

In one embodiment, the outside walls of membrane wall 106 can be insulated, thereby, reducing heat loss from the process and maximizing the percentage of total heat generated in combustor 102 that preheats water in the membrane wall or produces steam.

The incoming oxidation air can be uniformly distributed through the floor of combustor 102 with, in one instance, a bubble-cap-type distributor 116. It should be noted that the present invention is not limited to just a bubble-cap distributor. Rather, other types of air distribution systems can be used. Natural gas can be introduced through gas lances or dedicated bubble caps at low-load operation to improve turndown or speed start-up. Duct burners (not shown) preheat the incoming oxidation air to achieve a bed temperature of about 1100° F. (approximately 593° C.). At this temperature the natural gas introduced directly into the lower portion of combustor 102 will auto-ignite. Windbox 114 is refractory lined with Kaowool®-type backing to allow low-temperature alloys to be used to form windbox 114's housing. Alternately, windbox 114 can be replaced with a windbox design where the windbox enclosure comprises refractory-lined water-cooled membrane-wall construction.

Fresh make-up particles can be added through the top of the sloped roof 118 of the fluidized-bed combustor 102 or into the standpipe 158. Previously, designs for alternative systems utilized a design where the particle make-up is added through an Iso-Kinetic Feeder (such as the one disclosed in U.S. Pat. No. 4,825,706, the complete text of which is hereby incorporated herein in its entirety) into the standpipe to provide make-up material and simultaneously measure the circulation rate of metal oxide through the L-Valve 112. However, this process is slow. Thus, the design/system of the present invention provides a faster, more convenient way to add make-up material.

Manways 120 are provided for easy access to combustor 102 to inspect distributor 116, heat exchanger tube bundle 110, particle receiver 128, and reducer reactor 140. Bed drain location(s) and line(s) (not shown) can be installed through windbox 114 and distributor 116 to allow for removal of agglomerated particles or bed inventory for maintenance. In some embodiments, a fluidized-bed cooler (not shown) (see, e.g., U.S. Pat. No. 5,797,334 and CA 2,585,400, the complete texts of which are hereby incorporated herein in their entireties) can be installed on the bed drain lines to cool the particles thereby eliminating the need for water-cooled screws to remove the bed material, thereby, saving considerable cost on the bed drain system. Alternately, water-cooled screws can be used to control the drain rate and cool the drained solids. The technologies can also be used to control the drain rate of solids and cool the solids that are drained from L-valve 112.

Riser 122 can be refractory-lined membrane-wall construction or refractory-lined metal jacket. The refractory-lined membrane-wall construction is shown in FIG. 3. In this embodiment, a refractory-lined membrane-wall construction is utilized. Riser 122 shares a wall 124 with a reducer reactor 140 and particle receiver 128. This allows riser 122 and reducer 140 enclosures to be at the same wall temperature and thereby expand at the same rate. This reduces differences in thermal expansion that are a problem with the previous chemical looping arrangements whereby the riser was a separate enclosure apart from the reducer reactor 140. Riser 122 is, in one embodiment, rectangular as shown in FIG. 4 (see, e.g., view A-A and top view H-H). Since additional heat is not being generated, the refractory lining on riser 122 can be formed from erosion resistant refractory to protect the membrane walls from erosion. Erosion resistant refractory has been used successfully on the leading edges of a circulating fluidized bed (CFB) wingwalls, in transport gasifiers and in catalytic crackers.

The metal oxide particles discharge from riser 122 at a right angle to the vertical portion of riser 122 through an expanded section 126 where the velocity of the gas is greatly reduced. The discharge opening is configured with vertically oriented side-bent tubes with gaps in between FIG. 4, view A-A and plan section view D-D. The total open area of the gaps allows the velocity of the oxygen-depleted air that is transporting the particles to be reduced below the erosion limit of the refractory-coated membrane wall tubes. The particles flow into the large open volume of particle receiver 128 further slowing down and dropping out into particle receiver 128. The essentially particle-free, oxygen-depleted air exits the system though a combustor gas exhaust port 130 on the back of particle receiver 128. This arrangement results in superior separation of the metal oxide particles from the carrying air compared with the previous pilot facility arrangement which comprises a disengagement zone. The transition from riser 122 to particle receiver 128 is modelled after a U-beam arrangement on commercial circulating fluidized-bed boilers. This arrangement provides structural support for the common wall that is shared by riser 122, particle receiver 128 and reducer reactor 140 by using the membrane wall tubes to carry the load of the wall.

Particle receiver 128 comprises a refractory-lined membrane wall construction including a hopper 132. Particle receiver 128 operates as a moving-bed vessel. Ideally, no chemical reaction occurs in particle receiver 128. Since the downward particle velocity in the moving-bed particle receiver 128 is low, the refractory can be a highly insulating refractory because erosion resistant properties are not required. Particle receiver 128 is furnished with at least one discharge dipleg 134 to transfer the fully oxidized metal oxide to the center of reducer reactor 140. The discharging solids form a mound of solids with an angle of repose of about 25 degrees with respect to a horizontal plane extending to the front, back and side walls of top moving bed 136. Discharge dipleg 134 is square, but could take on other shapes such as rectangular to improve distribution of solids at the inlet of top moving bed 136. Dipleg 134 extends below reducer gas exhaust port 138 on the back of reducer reactor 140 to provide a gas head space above the particle level in hopper 132 to allow the product gas from reducer 140 to gather prior to exhausting at the top of reducer 140. The length of dipleg 134 can be, or is, adjusted to ensure that it provides sufficient backpressure such that the path of least resistance for the product gas is out the exhaust port 138 rather than up dipleg 134. The product gas comprises mainly carbon dioxide, moisture and contaminants, such as sulfur dioxide, nitrogen oxide, HCl, mercury, and particulate as ash and attrited metal oxide. Exhaust gas from reducer 140 and exiting through port 138 can be treated by traditional downstream environmental control equipment. A portion of the membrane tubes making up the side walls are bent out of plane to form particle receiver hopper 132.

Reducer reactor 140 comprises a refractory-lined membrane wall construction. The membrane wall tubes are fed from headers 142 located at the top of reducer reactor hopper 152 on all four sides. Again, due to the slow velocity of the metal oxide particles in reducer reactor 140 the refractory lining can be fabricated from highly insulating refractory. Reducer reactor 140 is divided into a top moving-bed zone 136 and bottom moving-bed zone 144. Again, a portion of the membrane wall tubes are bent out of plane to form a rectangular funnel hopper section 145 to guide the metal oxide particles to the center of the reducer reactor at the top of bottom moving-bed zone 144, and create a void into which fuel can be fed. Coal or another suitable fuel is fed in between the two zones from the front and/or back of the moving-bed reducer 140 into the void created by the membrane wall tubes bent out of plane, and the elevation of which depends on the fuel reactivity. Multiple feed points 148 can be included to provide uniform distribution of fuel across the plan area of the reactor into the void created by the bent membrane wall tubes. In one embodiment, the fuel is fed to the reactor with a top particle size of about 500 μm. The fuel is injected through the water-cooled feed nozzles with recycled carbon dioxide, thereby, limiting the injection or infiltration of oxygen into reducer reactor 140.

The hopper 132 of reducer reactor 140 can comprise a single, refractory-lined metal shell hopper or multiple pant-leg-type hoppers as shown in FIG. 4B at 150. The inside walls of hopper 152 should form an inside angle of at least about 45 degrees, at least about 50 degrees, at least about 55 degrees, at least about 60 degrees, at least about 65 degrees, or even at least about 70 degrees with respect to a horizontal plane even with the bottom of the hopper 132. This ensures that the flow profile of metal oxide particles within the bottom moving bed 144, which can have a relatively broad distribution, is that of a mass-flow hopper (i.e., flowing uniformly downward across the entire plan area of the hopper) and that no ratholing, bypassing or short circuiting of metal oxide solids occur. Turning to FIG. 4B, enhancer gas comprises carbon dioxide and/or steam and is introduced at any point along the hopper height and at multiple locations to ensure good distribution of the enhancer gas across the complete flow area of the reducer reactor. Steam is the preferred enhancer gas because the steam inhibits the formation of coke on solid particle surfaces in a reducing atmosphere. Metal oxides are somewhat protected against coke formation because the excess oxygen on the surface of the metal oxide can oxidize carbon monoxide thereby inhibiting the formation of coke.

The general direction of particle flow in reducer reactor 140 is downward from the feed points. The volatile portion of the fuel is released quickly as gaseous species as the fuel encounters the hot particles. The general direction of flow of the volatile gas species is upward from the fuel feed points. The volatile gas species react readily with the downward flowing, fully oxidized metal oxide particles to form carbon dioxide, water and partially reduced metal oxide particles. The carbon dioxide and water exit the top moving-bed reducer zone 136 through the reducer gas exhaust port 138 on the back of the top moving-bed zone 136. The partially oxidized metal oxide particles continuing flowing downward into bottom moving-bed zone 144. As the solid fuel begins to oxidize within the downward flowing bed of hot metal oxide particles, the individual fuel particles begin to shrink in size. The general direction of flow of the enhancer gas is upward through the reducer reactor 140. As the shrinking fuel particle that is comprised primarily of char moves downward through the outer annular flow area of the bottom moving-bed reactor zone 144, it encounters the upward flowing enhancer gas introduced in region below the moving-bed reactor zone. Enhancer gas (e.g., carbon dioxide and/or steam) convert the char to carbon monoxide and hydrogen. The carbon monoxide and hydrogen can react readily with the remaining oxygen in the metal oxide particle to form carbon dioxide, water and/or residual ash. The carbon dioxide, water and residual ash move to the center of the bottom moving-bed zone 144. The carbon dioxide and water readily flow upward within the center of bottom moving-bed zone 144 with enhancer gas towards the top moving-bed zone 136 (i.e., countercurrent to the downward flowing metal oxide particles). As the char burns out of the individual fuel particles, the residual ash particles reach the size that the upward interstitial gas velocity within downward flowing bed zone 144 of reduced metal oxide particles exceeds the elutriation velocity of the residual ash particles and the residual ash particles begin flowing upward (i.e., countercurrent through the moving bed of reduced metal oxide particles toward reducer exhaust port 138). At the point where the downward flowing metal oxide particles reach the discharge cone of reducer hopper 152, the particles are reduced in oxidation state to primarily FeO. Of course, by rules of equilibrium, there will also be a portion of the metal oxide in other oxidation forms, such as $Fe_3O_4$, $Fe_2O_3$ and Fe, or any of the other metals, metal oxides or metal compounds disclosed above.

The reduced metal oxide particles exiting the reducer hopper(s) 152 discharge into a refractory-lined combination standpipe/L-valve 154. Standpipe/L-valve 154 is, in one instance, a refractory-lined uninsulated metal pipe. The refractory lining comprises, in one embodiment, at least two layers, a hot-face erosion resistant first layer backed by an insulating refractory second layer. Standpipe/L-valve 154 has an expansion joint 156. Zone seal gas, consisting of nitrogen or carbon dioxide (but not limited solely thereto) is introduced midway down standpipe/L-valve 154 to ensure product gases from reducer 140 do not pass into combustor 102 by creating a backpressure in the standpipe. In addition to the enhancer gas, the zone seal gas ensures an upward (countercurrent) flow of gases through top moving-bed zone 136 and bottom moving-bed zone 144 of reducer 140. Aeration gas, typically nitrogen (but not limited solely thereto), is introduced through a port (not shown) at a location on the inside diameter of the horizontal leg 160 above the centerline of the horizontal leg 160 to control the metal oxide circulation rate.

L-valve 112 is furnished with a drain line 162 that is the full inside diameter of L-valve 112 to allow for, or permit, the removal of agglomerates. The inside diameter of the standpipe and vertical portion of L-valve 112 does not have to be the same diameter as the horizontal leg of L-valve 112. The close coupling of riser 122 and reducer reactor 140 through the shared common wall 124 allows for, or permits, close coupling of L-valve 112 with combustor 102 which simplifies the design of L-valve 112 compared to having a sloped horizontal section of L-valve 112 to assist return of the metal oxide to combustor 102. If the vertical leg of L-valve 112 is displaced too far horizontally from the discharge opening into combustor reactor 102, there is insufficient pressure head of solids to force the solids through L-valve 112 and achieve the required circulation rate of the solids. Typically, to overcome this problem, standpipe 158 is made taller to achieve the required static pressure head of solids. A taller standpipe raises the elevation of all the upstream components, which increases the fabrication and construction costs as well as increases the parasitic power losses due to a higher pressure required at the base of combustor 102 to transfer the solids back to the top of the particle receiver 128.

Given the above, standpipe/L-valve 154, in one instance, contains at least one suitably designed expansion joint 156 that permits expansion and contraction due to changes in temperature and/or heat dissipation. In one embodiment, expansion joint 156 can be located at a suitable point in standpipe/L-valve 154 and in any suitable orientation so as to permit standpipe/L-valve 154 to undergo one or more dimensional changes in response to changes in temperature and/or heat dissipation. While not wishing to be bound to any one embodiment, various suitable expansion joints are known to those of skill in the art and as such numerous types of expansion joints can be designed to work with system and apparatus described herein.

The cooling circuitry for the membrane wall components is in bottom headers 142/164 and out top of the membrane-wall components 166. Combustor 102 and riser 122 are on a different circuit than reducer 140. In another instance, it could be possible to have the cooling water enter combustor 102 and transfer to the bottom of reducer 140. The cooling water exiting the membrane wall circuits is routed to a vertical separator or steam drum (not shown) to allow for the separation of saturated water and saturated steam. The saturated steam can then be routed to a convection pass for additional preheat.

Figure 5:
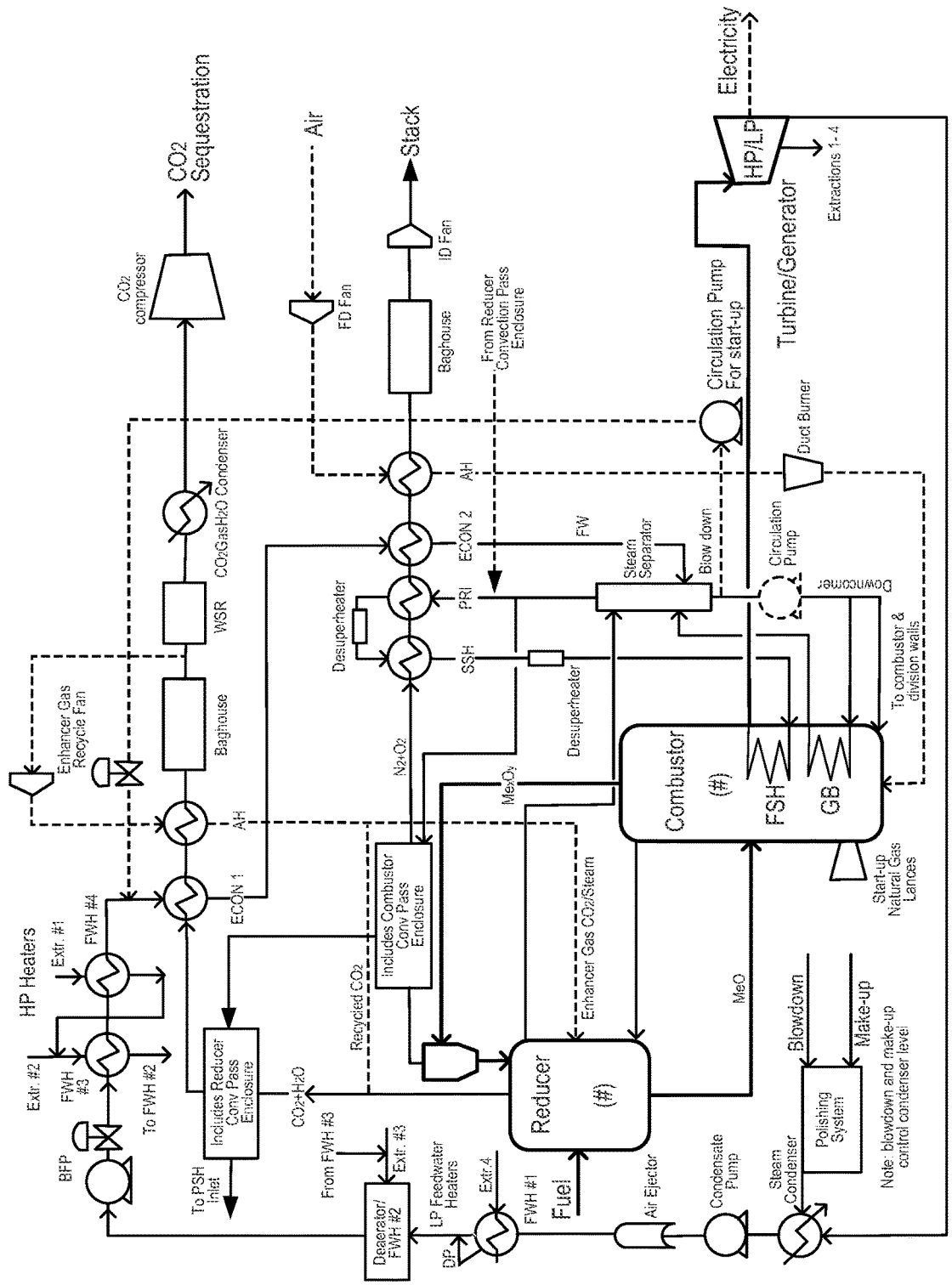
FIG. 5 is an illustration of an exemplary steam cycle in connection with the system/apparatus of the present invention.

Turning to FIG. 5, as can be seen from the illustration in FIG. 5 the condensate and steam extractions for feed water heating are similar to a traditional steam cycle. After the preheated feed water passes through two economizer banks the subcooled liquid enters the steam separator. The subcooled liquid from the bottom of the steam separator is fed (natural circulation) or pumped (forced circulation) to the membrane wall of the combustor, or the generating surface in the combustor and/or potentially to the membrane wall of the reducer. Alternately, the membrane wall of the reducer could be cooled by subcooled liquid from the top of the combustor as shown in FIG. 5. The two-phase fluid from the top of the membrane wall of the combustor and/or the reducer is returned to the steam separator. While there are two separate gas flow streams requiring separate convection passes, the steam path is shown in series for the two (see FIG. 5). This allows for acceptable steam mass fluxes within the enclosure and superheater components. The convection passes can contain economizer, primary and secondary superheater, and reheater components or any combination. From the steam separation device, the steam passes through the enclosure walls of the combustion convection pass. The walls are multi-pass to allow for acceptable steam-side mass flux and therefore higher low-load steam film heat transfer and lower cost materials. From the enclosure the steam passes to the enclosure of the reducer convection pass. Again, these walls are multi-pass. A steam bypass from the steam separation device to the superheater may be installed to reduce the pressure drop at high loads where steam-side mass fluxes and heat transfer coefficients are higher than required. From the reducer enclosure the steam passes to the primary superheater located in the combustor connection pass (as shown) where additional heat is added. A de-superheater or attemperator is located downstream of the primary superheater to control the overall absorption of the steam and maintain the final steam temperature near the set point. Finally, the steam passes through the secondary superheater in the combustor convection pass where the balance of the heat is added to the steam to achieve the desired final steam temperature. Optionally, a de-superheater or attemperator may be located downstream of the secondary superheater to control the overall absorption of the steam and maintain the final steam temperature near the set point. Alternately, the steam exiting the secondary superheater can be a pass-through heat surface located in the combustor for Final Superheat (FSH). Alternately, the surface in the combustor can be used to reheat steam from an intermediate stage (if present) of a steam turbine. The superheated steam is sent to the steam turbine via traditional means. Alternately, a circulation pump can be installed between the liquid discharge of the steam separator (Vertical Separator in FIG. 5) to recycle liquid water back to the inlet of the first economizer for start-up. This is to protect the heat transfer surfaces with cooling water during initial start-up. Alternately, the reducer membrane walls could be cooled with steam from the steam separator rather than subcooled liquid from the top of the combustor membrane, which would reduce the heat transfer from the reducer to the membrane walls thereby allowing the operation of the reducer to be more nearly adiabatic. Alternately, a portion of the superheated steam, which can be drawn from the primary, secondary, reheat or final superheat streams can be introduced to the reducer as enhancer gas with or without $CO_2$. Alternately, rather than one reducer and combustor pair, the system could include multiple pairs of combustors and reducers as indicated by the "#" or any combination of different numbers of combustor and reducers generating the steam, e.g., one combustor possibly servicing two reducers. This would have the advantage of making the riser of the combustor larger and easier to maintain for small scale modular units.

In light of the above, the system and/or apparatus of the present invention yields one or more of the following advantages: (i) thermal expansion can be accommodated by single expansion joints in standpipe(s) 154 due the two sides sharing a common wall; (ii) refractory-lined membrane wall provides faster start-up than heavy refractory-lined vessels with thicker refractory. Further, due to the lower surface-to-volume ratio in the moving-bed reducer and the poor heat transfer through a packed moving bed, the heat loss to the walls of the refractory-lined membrane wall on a percent of thermal input basis is much less; (iii) the cooling circuitry in combustor 102/riser 122 and moving-bed reducer produce saturated steam at the top of the reactors which can be sent to a steam drum or vertical separator for steam separation and rerouting to downstream superheat surface or recycled back to saturated water cooling surface or other plant processes; (iv) the arrangement of membrane panel tubes near the coal feed elevation readily allow for multiple evenly spaced feed points to achieve an input per plan area that provides complete conversion of the fuel and agglomeration-free operation; (v) with membrane-wall construction traditional techniques for providing structural support such as stiffeners and buck stays can be used; (vi) the design can be top-supported which makes accommodating thermal expansion easier and providing structural support easier; (vii) the hoppers and flow channels can be fabricated readily by bending membrane wall tubes out of plane rather than difficult pouring and forming with refractory; (viii) the refractory dry-out and cure at the target operating temperature can be achieved in a shorter time frame because the refractory-linings are thinner; (ix) walls and components are straight and rectangular in shape rather than round which makes scaling up to larger size modules easier; (x) the close coupling of the standpipe/L-valve 154 and combustor 102 results in a short horizontal leg of L-valve 112 which means lower pressure drop for a target circulation rate, and consequently a shorter standpipe 154 to provide the required motive force (static pressure of solids), and lower cost fabrication/construction as well as lower parasitic power cost; (xi) countercurrent moving-bed reducer provides higher conversion efficiency and delivers highest temperature gas to the convection pass components at the outlet of reducer 140 and combustor 102 for efficient steam generation; (xii) the arrangement of the fuel feed point geometry allows for low-cost, multiple feed points, which improves conversion efficiency while minimizing feeder cost. U.S. Pat. No. 3,204,942 (the complete text of which is hereby incorporated herein in its entirety) distribution bottle provides an option for multiple feed points from a single loss-of-weight or volumetric feeder; (xiii) the locations of the particle receiver combustor gas exhaust port and the top moving-bed reducer gas exhaust ports can be located (centered) on the back wall to ensure no short circuiting of gases or bypassing of metal oxide and/or ash particles within combustor 102, riser 122 or reducer 140; (xiv) in the event of a black plant trip, the aeration gas to the L-valve 112 can be shut off and the metal oxide in the combustor transported up into the particle receiver hopper for hot storage until the power is restored and the system can be restarted. The residual metal oxide in combustor 140 can cool in the presence of the in-bed tube bundle as the forced draft blower and ID fans roll down; (xv) top moving-bed dipleg is rectangular to provide distribution of hot metal oxide particles along a full axis of the bottom moving bed; (xvi)

permits the use of multiple hoppers (pant-leg hopper design) reduces the overall height of the apparatus, reduces parasitic power associated with circulating the metal oxide and reduces construction cost; (xvii) in general, using a thinner refractory layer on the membrane-wall components leads to a layer less prone to breaking off and creating hot spots on the enclosure. Also, if there is less likelihood of the refractory breaking off in pieces, then there is less likelihood that the downstream passages, such as the Standpipe/L-valve or the drain lines, will plug with pieces of refractory.

In light of the above, system 100 can alternatively be modified in various manners each of which is to be viewed as non-limiting in nature and can appropriately combined with one or more other alternatives listed below. Possible alternatives to the various embodiments disclosed above include, but are not limited to, using coke as a fuel source; using char as a fuel source; using biomass and/or derivatives of biomass as a fuel source; using any solid fuel source; using a gaseous fuel source, including, but not limited to, natural gas, syngas, flare gas, coke oven gas, etc.; using any combination of two or more of any of the fuels sources disclosed herein as a fuel; for each reducer reactor, where there is one or more than one hopper (plurality)—feeding one or more than one (plurality) standpipe/L-valve combinations; using steam as an enhancer gas; using carbon dioxide as an enhancer gas; using recycled carbon dioxide saturated with moisture as an enhancer gas as the moisture inhibits coke formation; an embodiment where the riser is refractory-lined rather than membrane-wall construction; an embodiment where the particle receiver is refractory-lined metal shell rather than membrane-wall construction; an embodiment where the riser and standpipe can be fabricated in sections to allow for easy maintenance, specifically refractory repair or replacement; an embodiment where the aeration gas is carbon dioxide; an embodiment where the aeration gas is air; an embodiment where the aeration gas is steam; an embodiment where in-bed heat exchanger 104 comprises generating surface, superheat surface, reheat surface or a combination of all; an embodiment where in-bed heat exchanger bundle (see, e.g., 104/110) comprises tubes in a staggered arrangement; an embodiment where standpipe/L-valve 154 can be replaced with a loop seal, J-valve or other type of non-mechanical valve; and an embodiment where the windbox 114 enclosure comprises refractory-lined membrane-wall construction.

In the various embodiments herein, the particles may be of different sizes to accommodate various reaction rate and riser and combustor designs. The apparatus may be adapted to accommodate particles sizes ranging from 25 micrometers to 2.5 millimeters.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A chemical looping system comprising:
   a fluidized-bed combustor reactor comprising a windbox, a heat exchange surface, and an oxidant distribution grid;
   a particle;
   a particle separator;
   a riser;
   a particle receiver; and
   a moving-bed reactor;
   wherein the fluidized-bed combustor reactor oxidizes the particle, creates a carrier gas, and the riser transports the oxidized particle and the carrier gas to the particle separator; and
   wherein the particle receiver receives the oxidized particle from the particle separator and the moving-bed reduces the oxidized particle in the presence of a carbon-based fuel; and
   wherein the riser and the moving-bed reactor share a common wall.

2. The chemical looping system of claim 1, further comprising:
   a oxidizer reactor, wherein the reduced particle is partially oxidized in the presence of a steam stream upstream of the fluidized-bed combustor reactor to produce a hydrogen stream and the partially oxidized particle is transported to the fluidized-bed combustor reactor.

3. The chemical looping system of claim 1, further comprising:
   a standpipe, and
   a L-valve, wherein the standpipe and the L-valve transport the reduced particle from the moving-bed reactor to the fluidized-bed combustor reactor and the fluidized-bed combustor reactor reoxidizes the reduced particle.

4. The chemical looping system of claim 1, wherein the common wall is a membrane wall.

5. The chemical looping system of claim 4, wherein the membrane wall is insulated.

6. The chemical looping system of claim 3, wherein the distribution grid is a bubble cap-type distributor capable of supplying a oxidant, a fuel, or a oxidant/fuel mixture.

7. The chemical looping system of claim 3, wherein the heat exchanger surface is a serpentine in-bed heat exchange surface formed from serpentine in-bed heat exchanger tubes.

8. The chemical looping system of claim 7, wherein a leading edge of the serpentine in-bed heat exchanger tubes are set back from the L-valve.

9. The chemical looping system of claim 3, wherein the carbon-based fuel is selected from one or more of coal, oil, oil shale, oil sands, biomass, methane-rich gases, flare gases, fuel-rich waste gases from fuel cells, or mixtures of two or more thereof.

10. The chemical looping system of claim 3, wherein the riser is rectangular in shape.

11. The chemical looping system of claim 3, wherein the particle receiver comprises an expanded section whereby the velocity of the carrier gas for the oxidized particle is reduced and the oxidized particle drops out of suspension.

12. The chemical looping system of claim 11, wherein the particle separator further comprises an outlet port for the carrier gas and an eroded oxidized particle.

13. The chemical looping system of claim 3, wherein at least one wall of the particle separator is a membrane wall and the membrane wall removes thermal energy from the system.

14. The chemical looping system of claim 3, wherein the carbon-based fuel is introduced at the bottom of the moving-bed reactor and the moving-bed reactor operates with counter current flow.

15. The chemical system of claim 3, wherein the carbon-based fuel is introduced at the middle of the moving-bed reactor.

16. The chemical looping system of claim 3, wherein the moving-bed reactor comprises one or more feed ports and the ports introduce a gaseous stream to a bottom portion of the moving-bed reactor.

17. The chemical looping system of claim 3, wherein the moving-bed reactor is a reformer reactor and a fuel is introduced to the top of the moving-bed reactor, and the moving-bed reactor operates with co-current flow.

18. The chemical looping system of claim 3, wherein the moving-bed reactor comprises one or more feed ports and the ports introduce a gaseous stream to a top portion of the moving-bed reactor.

19. The chemical looping system of claim 3, wherein the standpipe contains a moving bed of solids that inhibits mixing of gases between the fluidized-bed combustor reactor and the moving-bed reactor.

20. The chemical looping system of claim 3, wherein the L-valve controls a flow of solids to the moving-bed reactor.

21. The chemical looping system of claim 3, wherein the particle is between about 25 micrometers to about 2.5 millimeters wide.

22. The chemical looping system of claim 3, wherein the system is operated under pressure.

23. The chemical looping system of claim 3, wherein the system is operated with one or more parallel elements.

24. The chemical looping system of claim 4, wherein one of water, steam, carbon dioxide, or air flows through the membrane wall.

25. The chemical looping system of claim 1, wherein the common wall is also shared with the particle separator.

26. The chemical looping system of claim 3, wherein a $CO_2$ stream is introduced into the system as an enhancer gas.

27. The chemical looping system of claim 3, wherein the moving-bed reactor further comprises an outlet gas port at an elevation above that at which the oxidized particle enters the moving-bed reactor.

28. The chemical looping system of claim 10, wherein the riser further comprises a discharge dipleg.

* * * * *